United States Patent Office 3,479,747
Patented Nov. 25, 1969

3,479,747
CONTROL OF DIMENSIONS OF NEWLY-OPENED BALES OF ACRYLIC STAPLE FIBERS
Charles H. McGill, Decatur, Ala., assignor to Monsanto Company, St. Louis, Mo., a corporation of Delaware
No Drawing. Filed May 3, 1968, Ser. No. 726,539
Int. Cl. F26b 17/00
U.S. Cl. 34—22    6 Claims

ABSTRACT OF THE DISCLOSURE

End-to-end dimensions of newly-opened pressure-bound bales of acrylic staple fibers are controlled by maintaining regulated minimum levels of ambient relative humidity and temperatuer prior to the baling operation and thereby preconditioning the fibers. Maximally optimum end-to-end expansion of bales is obtained by subjecting fibers to an ambient relative humidity of at least 55% and an ambient temperature of at least about 65° F. prior to the baling operation.

BACKGROUND OF THE INVENTION

This invention relates to the baling of acrylic staple fibers and more particularly to a method for controlling the dimensions of such bales when released from packing restraints.

Commercially, synthetic fibers are manufactured, processed, cut to staple and baled at one location; and then transported to a mill for subsequent processing and fabrication of the textile end product.

Polyacrylonitrile fibers, with relatively high bulk, and moisture regain characteristics ranging from 1.5 to 2.5 at a relative humidity of 65% and a temperature of 70° F., after having been baled in staple form under relatively dry static conditions, have been known to expand suddenly when baling ties are removed, causing inconvenience to processers of the staple fiber. Processing equipment in commercial mills is commonly constructed to accept bales of a fixed height, as for example 55 inches, the term "bale height" referring to the end-to-end dimension of the bale. Uncontrolled and sudden expansion of bales of staple fiber has caused a lack of uniformity in mill processing. For example, a commonly used method of blending is to employ several open hoppers of a type which are equipped with automatic weighing devices. A battery of such hoppers are arranged to open baled stock and drop it on a scale pan attached to each hopper. The efficiency of the hoppers is affected adversely by a variance in the size of bales, and excessive bale dimensions may also interrupt an automated process.

One method of preventing a disproportionate expansion of the bale when the ties are cut is to store the bales at a high temperature and relative humidity for periods of time sufficient to provide for a reasonable moisture regain. The storage of bales cut under static conditions, baled under pressures of about 3250 lbs. per square inch at heights of 42 inches, and stored at a temperature of 90° F. and from 80 to 90% relative humidity for a period of one week results in open bale heights of about 55 inches. Similar bales stored at the same temperature and relative humidity for a period of one month result in open bale heights of about 48 inches.

It is an object of this invention to provide for control of open bale dimensions without high temperature-high humidity storage.

Briefly, the object of this invention is accomplished by pre-conditioning the staple fiber at a minimum relative humidity of 55% and a minimum temperature of 65° F. It has been found that with acrylic staple fibers so pre-conditioned, maximally optimum bale expansion of newly opened bales will be maintained regardless of the time during which the fiber remains baled, and the temperature and humidity conditions to which the bale is subjected.

Other objects and advantages of the invention will become apparent from the following detailed description.

DESCRIPTION OF THE PREFERRED EMBODIMENT

By "acrylic fibers" is meant those synthetic fibers derived from acrylonitrile polymers. By "acrylonitrile polymer" is meant polyacrylonitrile, copolymers, and terpolymers of acrylonitrile, and blends of polyacrylonitrile and co-polymers of acrylonitrile with other polymerizable mono-olefinic materials, as well as blends of polyacrylonitrile and such copolymers with small amounts of other polymeric materials, such as polystyrene. In general, fibers and filaments produced from a polymer made from any monomeric mixture of which acrylonitrile is at least about 80 percent by weight of the polymerizable content, or from blends of such polymers with relatively small amounts of blending polymers, are subject to the practice of the present invention. Typically these polymers are spun into tow of from about 600–30,000 filaments with a denier per filament range of from about 1–30. The tow is crimped at about 5–20 crimps per inch and cut to a staple length of from about 3–6 inches.

Relative humidity is the ratio, in percent, of the moisture actually in the air to the moisture it would hold if it were saturated at the same temperature and pressure. Relative humidity is a useful index of dryness or dampness for determining evaporation, or absorption of moisture. The minimum relative humidity suitable to the practice of the instant invention is 55%. Below this minimum ambient relative humidity for preconditioning of fibers, bales of acrylic staple fiber, unless subjected to high humidity storage, will expand, when opened, to dimensions disproportionate to the amount of pressure applied in baling. Maximally optimum expansion will vary as the baling pressure varies. For pressures of between 3000 and 3500, it has been found that expansion percentages can be limited to a maximum of about 32% (expansion of a 42″ bale to 55″). The preferred relative humidity is 60%, which provides for the individual variances of open bales, and for other factors including storage conditions.

The minimum temperature of 65° F., and the preferred temperature of 80° F. has been determined experimentally, as the minimum of a temperature range suitable for the reasonably rapid moisture regain in acrylic fibers. There are no upper temperature limits, except that acrylic fibers begin to decompose at temperatures of between 455°–490° F.

Measure and control of relative humidity is by means of a humidistat, which is used to control either humidifying or dehumidifying equipment by the regulation of electric or pneumatic switches, valves or dampers. As is well known in the air conditioning arts, an electronic humidistat includes a sensing element and a relay amplifier. The sensing element consists of alternate metal conductors on a small flat plate with a plastic coating. An increase or decrease of the relative humidity causes a decrease or increase in the electrical resistance between the two sets of conductors; and the change in resistance is measured by the relay amplifier. Humidification can be accomplished by passing air-vapor over a wetted coil (or through a high-rate stream of wash water) when the coil surface (and/or droplet surface) is maintained at the dry-bulb temperature of the air. Another method is by discharging directly into the air-vapor stream the desired quantity of water in the form of stream. Or it can be done by direct evaporation of water from a pan placed in a hot air furnace or from trays placed on radiators. Dehumidification can be accomplished by absorption in which a moist air stream passes through a spray which utilizes a liquid sorbent that undergoes physical or chemical change as it removes water vapor from the atmosphere. It may also be accomplished by adsorption in which a sorbent such as silica gel or activated bauxite undergoes neither chemical nor physical change, but tends, often through capillary action, to reduce the surface vapor pressure and lend to condensation of water vapor from the air stream within its capillary openings.

The period during which the fibers are subjected to these conditions of humidity and temperature, in order to accomplish the object of this invention, is for at least 16 hrs. and preferably 36 hrs. Conditions described preferably but not necessarily prevail during the baling operation and should proceed the baling operation to provide a sufficient duration of time. Commercially, fibers are commonly cut to staple just prior to baling and in such case these conditions preferably prevail during the cutting operation, but this is not essential so long as the exposure period is as described.

Baling may be accomplished by any known commercial method. Baling machines used in baling synthetic fibers commonly apply a force of up to about 4000 lbs. per square inch to the sides and ends of the fiber loads to achieve a standard compression to a given weight of fiber. The amount of force employed is not critical in the practice of the instant invention but the importance of control of bale heights increases as the amount of force is increased. The weight of a bale of acrylic fiber is commonly about 500 lbs.

The following examples will serve to illustrate the invention although they are not intended to be limitive.

EXAMPLES

Acrylic staple fibers were baled under conditions of pressure, temperature and relative humidity as shown in Table 1, and their opened bale height was measured 7 days later, during which period they were all subjected to the same varying conditions of temperature and relative humidity.

TABLE 1

| Example No. | Baling pressure (pounds per square inch) | Relative humidity, percent | Temperature ° F. | Opened bale height inches |
| --- | --- | --- | --- | --- |
| 1 | 3,250 | 66 | 75 | 53 |
| 2 | 3,250 | 68 | 74 | 49 |
| 3 | 3,250 | 57 | 85 | 55 |
| 4 | 3,250 | 67 | 81 | 52 |
| 5 | 3,250 | 32 | 75 | 62 |
| 6 | 3,250 | 30 | 82 | 58 |
| 7 | 3,250 | 33 | 75 | 60 |
| 8 | 3,250 | 34 | 75 | 61 |

Any departure from the description herein that conforms to the present invention is intended to be included within the scope of the claims.

I claim:
1. The method of controlling end-to-end dimensions of newly opened bales of acrylic staple fibers comprising preconditioning the fibers by maintaining an ambient relative humidity of at least 55% and a minimum ambient temperature of at least 65° F. for at least about 16 hours preceding the baling operation.
2. The method of claim 1 in which the relative humidity is 60%.
3. The method of claim 1 in which the ambient temperature is 80° F.
4. In a process for the manufacture of acrylic textile articles wherein acrylic fibers are cut to staple, baled, shipped and opened for further processing, the method of controlling end-to-end dimensions of newly opened bales comprising preconditioning the fibers by maintaining an ambient relative humidity of at least 55%, and a minimum ambient temperature of at least 65° F. for a period of at least about 16 hrs. preceding the baling operation.
5. The method of claim 4 in which the relative humidity is 60%.
6. The method of claim 4 in which the ambient temperature is 80° F.

References Cited

UNITED STATES PATENTS

| 2,201,389 | 5/1940 | De Give | 34—46 |
| 2,768,629 | 10/1956 | Maul | 34—46 X |
| 3,247,551 | 4/1966 | Whitehurst | 19—66 |
| 3,263,279 | 8/1966 | Chaikin et al. | 19—66 |

LLOYD L. KING, Primary Examiner

U.S. Cl. X.R.

34—46; 19—66